Patented July 18, 1933

1,918,873

UNITED STATES PATENT OFFICE

ALLISON KENNETH SCRIBNER, OF PORTSMOUTH, VIRGINIA, ASSIGNOR TO VIRGINIA SMELTING COMPANY, OF PORTLAND, MAINE, A CORPORATION OF MAINE

METHOD OF AND COMPOSITION FOR STRIPPING DYES

No Drawing. Application filed September 11, 1929. Serial No. 391,980.

This invention relates to a method of and composition for stripping the coloring matter from dyed textile materials such as cotton, wool, rayon and the like.

In the art of stripping textile materials, it has been found that in contradistinction to the prior art which involved the use of compositions containing hydrosulfites and formaldehyde, effective results may be obtained with hydrosulfite alone produced by the reaction of sulfur dioxide upon a reducing metal such as metallic zinc in the presence of water, or with very small amounts of formaldehyde as described in the Canadian patent of Frederick W. Binns, No. 289,690.

In accordance with my copending application, Serial No. 371,071, filed June 14, 1929, now abandoned, I have found that the presence of both zinc and an alkaline metal is desirable in the stripping bath, which is therein described as containing sodium sulfoxylate and zinc sulfate or sodium hydrosulfite and zinc sulfate.

It is now found as a part of the present invention that better stripping results may be accomplished in a convenient and economical manner, by the addition to the zinc hydrosulfite, for example, of a soluble acid salt of an alkali metal, such as sodium or potassium bisulfite or meta bisulfite (which becomes bisulfite in water solution). The resulting water solution is thereby rendered especially effective as a stripping agent and may be conveniently and safely handled and used without the presence of formaldehyde.

As a typical example of carrying out the invention, a zinc hydrosulfite solution may first be prepared by mixing twenty-eight parts of zinc dust with water in sufficient amount to form a free suspension and then introducing into the same a stream of sulfur dioxide (preferably in liquid condition) in an ultimate amount of approximately forty parts by weight, and adding to this mixture a suitable amount of the sodium bisulfite, as determined by the specific conditions of stripping. The proportions of bisulfite used may vary, for example, from approximately one-half to equal quantities (e. g.,—40 parts) by weight with reference to the sulfur dioxide content of the zinc hydrosulfite. However, while these proportions constitute a preferred range of mixtures of the reagents, it is to be understood that other proportions may be adopted in any given case, without departing from the scope of the invention.

The admixture of the acid salt with the hydrosulfite may be made in the initial preparation of the reagent materials but is preferably effected in the course of the actual stripping operation as by adding the acid salt to the stripping bath of zinc hydrosulfite plus water which has already thoroughly wet and covered the goods and which has been heated, for example, to about 160 to 180° F. It may be added either as a solution or in powdered form. In either case, the goods should then be poled or the bath agitated to insure uniform mixture and stripping effect.

The zinc hydrosulfite as first prepared, may be salted out from solution with an excess of common salt and the precipitated product washed with alcohol to produce dry powder, if desired. The dry product thus obtained may now be mixed with dry sodium or potassium meta bisulfite in approximately equal quantities (or less) by weight, of the sulfur dioxide content of the zinc hydrosulfite.

The resulting dry powdered mixture may be safely stored and shipped, and when ready for use may be added directly to the stripping bath or dissolved in a sufficient amount of water, and the resulting solution added to the stripping bath, as already described above.

The meta bisulphite above referred to in the case of the sodium salt has the formula $Na_2S_2O_5$ and is produced by drying and dehydrating sodium bisulphite $NaHSO_3$ with the loss of one molecule of water. Upon adding such compound to a water solution, however, this molecule of water is returned to the compound, thus regenerating the original sodium bisulphite $NaHSO_3$, and accordingly except for physical condition both types of compounds are equivalents in respect of the application of this invention.

I claim:

1. Process of treating colored textile fabrics and fibers and like materials which comprises the step of subjecting the same to a solution containing zinc hydrosulfite, and adding thereto a soluble acid sulfite of an alkali metal.

2. Process of treating colored textile fabrics and fibers and like materials which comprises the step of subjecting the same to a solution containing the reaction product of zinc dust and sulfur dioxide in water, and a bisulfite of an alkali metal.

3. Process of treating colored textile fabrics and fibers and like materials which comprises the step of subjecting the same to a solution containing the reaction product of zinc dust and sulfur dioxide in water, and sodium bisulfite.

4. Process of treating colored textile fabrics and fibers and like materials, which comprises the step of subjecting the same to a solution containing zinc hydrosulfite and a bisulfite of an alkali metal.

5. Process of treating colored textile fabrics and fibers and like materials which comprises the step of subjecting the same to a solution containing zinc hydrosulfite and sodium bisulfite.

6. Process of treating colored textile fabrics and fibers and like materials which comprises the steps of subjecting the same to a stripping bath containing zinc hydrosulfite, heating, and then adding an alkali metal meta bisulfite in the course of the stripping operation.

7. Process of treating colored textile fabrics and fibers and like materials which comprises the steps of subjecting the same to a stripping bath containing zinc hydrosulfite, heating, and then adding sodium meta bisulfite in the course of the stripping operation.

8. Process of treating colored textile fabrics and fibers and like materials which comprises the steps of subjecting the same to a stripping bath containing zinc hydrosulfite, heating, and then adding an alkali metal bisulfite in the course of the stripping operation.

9. Process of treating colored textile fabrics and fibers and like materials which comprises the steps of subjecting the same to a stripping bath containing zinc hydrosulfite, heating, and then adding sodium bisulfite in the course of the striping operation.

10. Composition for treating colored textile fabrics and fibers and like materials consisting substantially of the reaction product of zinc and sulfur dioxide in water, and a soluble acid sulfite of an alkali metal.

11. Composition for treating colored textile fabrics and fibers and like materials, consisting substantially of zinc hydrosulfite and a soluble acid sulfite of an alkali metal.

12. Composition for treating colored textile fabrics and fibers and like materials consisting essentially of zinc hydrosulfite, and a bisulfite of an alkali metal.

13. Composition for treating colored textile fabrics and fibers and like materials consisting essentially of zinc hydrosulfite and sodium bisulfite.

14. Composition for treating colored textile fabrics and fibers and like materials consisting essentially of zinc hydrosulfite and a meta bisulfite of an alkali metal.

15. Composition for treating colored textile fabrics and fibers and like materials consisting essentially of zinc hydrosulfite and sodium meta bisulfite.

ALLISON KENNETH SCRIBNER.